April 6, 1937.                J. C. CADY                    2,076,397
                            ANTIGLARE DEVICE
                          Filed Nov. 14, 1935
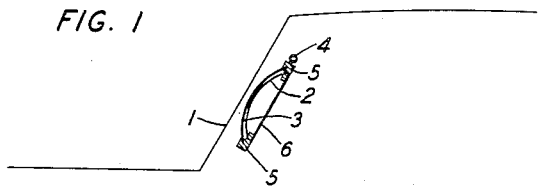
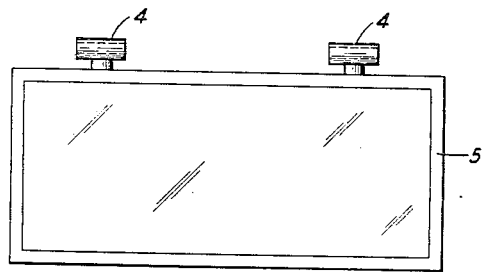
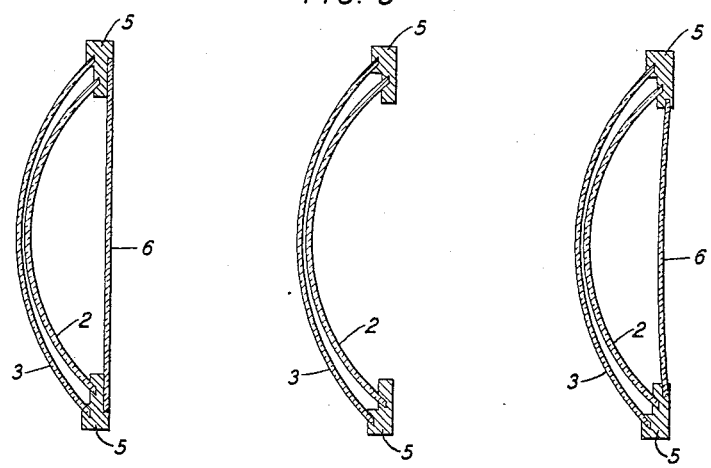
INVENTOR
J. C. CADY
BY
ATTORNEY Patented Apr. 6, 1937

2,076,397

UNITED STATES PATENT OFFICE 2,076,397

ANTIGLARE DEVICE

John C. Cady, Enfield, Conn.

Application November 14, 1935, Serial No. 49,705

6 Claims. (Cl. 296—97)

This invention relates to an anti-glare device or screen suitable, for example, for installation in automotive vehicles, railroads, and other vehicles which are employed for transportation.

An object of the invention is to prevent the glare from other vehicles, or from intense sources of lights which are approached, from interfering with the vision of the person driving the vehicle toward the light.

Another object of the invention is to decrease the hazards of night driving resulting from the glare of approaching vehicles which might otherwise obscure the driver's vision of the roadway.

Another object of the invention is to protect the driver of the vehicle so equipped rather than the drivers of vehicles with intense lights advancing towards him.

The object is accomplished by inserting in the line of vision of the driver a lens system of such nature that the optical flare of the lens assembly breaks up the transmitted light in the region in which the eyes of the driver are positioned. A brilliant beam or shaft of light thus reaches the driver considerably subdued and will no longer have a blinding effect upon him and he will at all times be able to see the road ahead of him, irrespective of the lighting conditions originating elsewhere than from the vehicle he is driving. The quantity of light striking the driver's eyes is thereby not subject to great variations so that the periods in which the eyes refocus themselves are of a minimum.

My invention is shown in the accompanying drawing in which Figure 1 shows a sectionalized and fragmentary view of my anti-glare screen as an auxiliary attachment to the windshield of an automobile, Figure 2 is a front view of such anti-glare screen, and Figure 3 are sections of alternative lens arrangements of my anti-glare screen.

In Figure 1 my anti-glare screen is shown installed behind the windshield 1 of an automobile from the frame of which it is pivotally supported by means of hinges 4. The anti-glare screen comprises an assembly of light transmitting lenses, of glass for example, and consist of a glass base 6, a convexo-concave lens 2, and one or more additional convexo-concave lenses 3, placed concave to concave. Lens, or lenses, 3 is, or are, bent to a larger radius than that to which lens 2 is bent. Lens 2 and lens 3 are so positioned that they approach, but do not actually touch, each other at a horizontal axis about midway the lens height. I have found that the best glare screening effects are obtained when the distance from the concave side of lens 2 to the convex side of lens 3 at said axis is about one half the sheet thickness. Each of the lenses is made of a sheet of thin glass bent cylindrically to a radius of the order of fifty or more times the sheet thickness, although base 6 may, except as shown in the third alternative of Figure 3, be an unbent sheet of flat glass. The entire assembly is suitably housed in a frame 5.

In use the anti-glare screen is so positioned that the concave surfaces are nearest the vehicle driver. A divergent light in front of the screen will thus lose in intensity by absorption, reflection, and the well known phenomenon of optical flare. Thus the lights of an approaching vehicle will not appreciably impair the vision of the vehicle driver, for parallel rays arriving at the screen from objects in the line of vision will not be so appreciably scattered.

What I claim is:

1. An anti-glare screen comprising two or more convexo-concave cylindrical lenses, said lenses positioned adjacent to and approaching each other at a horizontal axis about midway their height, and having their concave surfaces toward the driver of the vehicle.

2. An anti-glare screen in accordance with claim 1 in which the successive convexo-concave lenses have increasing radii of curvature.

3. An anti-glare screen comprising a light transmitting base, a cylindrical convexo-concave lens supported thereon, and a second cylindrical convexo-concave lens cooperatively positioned therewith, said second lens having a radius of curvature greater than said first lens.

4. An anti-glare screen comprising a light transmitting base, a convexo-concave lens, and a second convexo-concave lens having a radius of curvature greater than the first lens and positioned closely adjacent the first lens.

5. An anti-glare screen comprising a light transmitting base of relatively thin sheet glass, a convexo-concave lens of relatively thin sheet glass and bent to a radius of the order of fifty times the sheet glass thinness, a second convexo-concave lens of relatively thin glass bent to a radius of the order of more than fifty times the sheet glass thinness and positioned to approach said first lens at a horizontal axis midway the lens height to a distance one half the sheet thinness.

6. An anti-glare screen facilitating clear vision in driven vehicles comprising the combination of a plurality of convexo-concave cylindrical lenses extending over the complete solid angle of vision of the driver and positioned in close proximity to each other, with the concave surfaces thereof toward the driver, and also either immediately adjacent to and inside of, or integral with, the outer structure of the driven vehicle.

JOHN C. CADY.